US011152986B2

(12) United States Patent
Ray

(10) Patent No.: US 11,152,986 B2
(45) Date of Patent: Oct. 19, 2021

(54) FAST SPATIAL SEARCH USING PHASED ARRAY ANTENNAS

(71) Applicant: The Boeing Company, Chicago, IL (US)

(72) Inventor: Gary A. Ray, Issaquah, WA (US)

(73) Assignee: The Boeing Company, Chicago, IL (US)

(*) Notice: Subject to any disclaimer, the term of this patent is extended or adjusted under 35 U.S.C. 154(b) by 8 days.

(21) Appl. No.: 16/451,590

(22) Filed: Jun. 25, 2019

(65) Prior Publication Data

US 2020/0412424 A1 Dec. 31, 2020

(51) Int. Cl.
*H04B 7/06* (2006.01)
*H01Q 3/30* (2006.01)

(52) U.S. Cl.
CPC ............ *H04B 7/0617* (2013.01); *H01Q 3/30* (2013.01); *H04B 7/0619* (2013.01)

(58) Field of Classification Search
CPC ...... H01Q 3/30; H04B 7/0617; H04B 7/0619; H04B 7/06; G01S 7/2813; G01S 7/282; G01S 7/2925; G01S 7/2927; G01S 13/02; G01S 13/422; G01S 2013/0263
See application file for complete search history.

(56) References Cited

U.S. PATENT DOCUMENTS

| | | | | |
|---|---|---|---|---|
| 5,793,798 A * | 8/1998 | Rudish | .................... | G01S 7/023 375/130 |
| 10,243,273 B2 * | 3/2019 | Muesse | .................. | H01Q 1/362 |
| 10,277,269 B2 | 4/2019 | Ray | | |
| 2002/0084934 A1 * | 7/2002 | Vail | .......................... | H01Q 1/38 342/372 |
| 2016/0323757 A1 | 11/2016 | Braun et al. | | |
| 2017/0093467 A1 * | 3/2017 | Molev Shteiman | . | H04B 7/0695 |
| 2017/0127398 A1 * | 5/2017 | Andgart | ................ | H04W 16/28 |
| 2018/0227024 A1 | 8/2018 | Xia et al. | | |
| 2020/0212988 A1 * | 7/2020 | Lim | ..................... | H04B 7/0617 |

FOREIGN PATENT DOCUMENTS

WO 2017193953 A1 11/2017

OTHER PUBLICATIONS

Karam et al., "Complex Chebyshev Approximation for FIR Filter Design," IEEE Trans. on Circuits and Systems, Part II, Mar. 1995, pp. 1-11.
Extended European Search Report dated Oct. 20, 2020 in European Patent Application No. 20173838.2 (European counterpart to the instant U.S. patent application).

* cited by examiner

*Primary Examiner* — David B Lugo
(74) *Attorney, Agent, or Firm* — Ostrager Chong Flaherty & Broitman P.C.

(57) ABSTRACT

Systems and methods for rapidly finding detectable signals within the field-of-view of a phased array antenna. The transmit beam pattern is modified over time to increase signal spatial search performance over typical time-delay steering by producing a coarse-to-fine angular beam pattern with a tree-based approach to signal detection. A tree-based beam search is employed to select a beam having a narrower beamwidth for transmission at an angle from boresight that lies in an angular space where a signal has been previously detected.

20 Claims, 10 Drawing Sheets

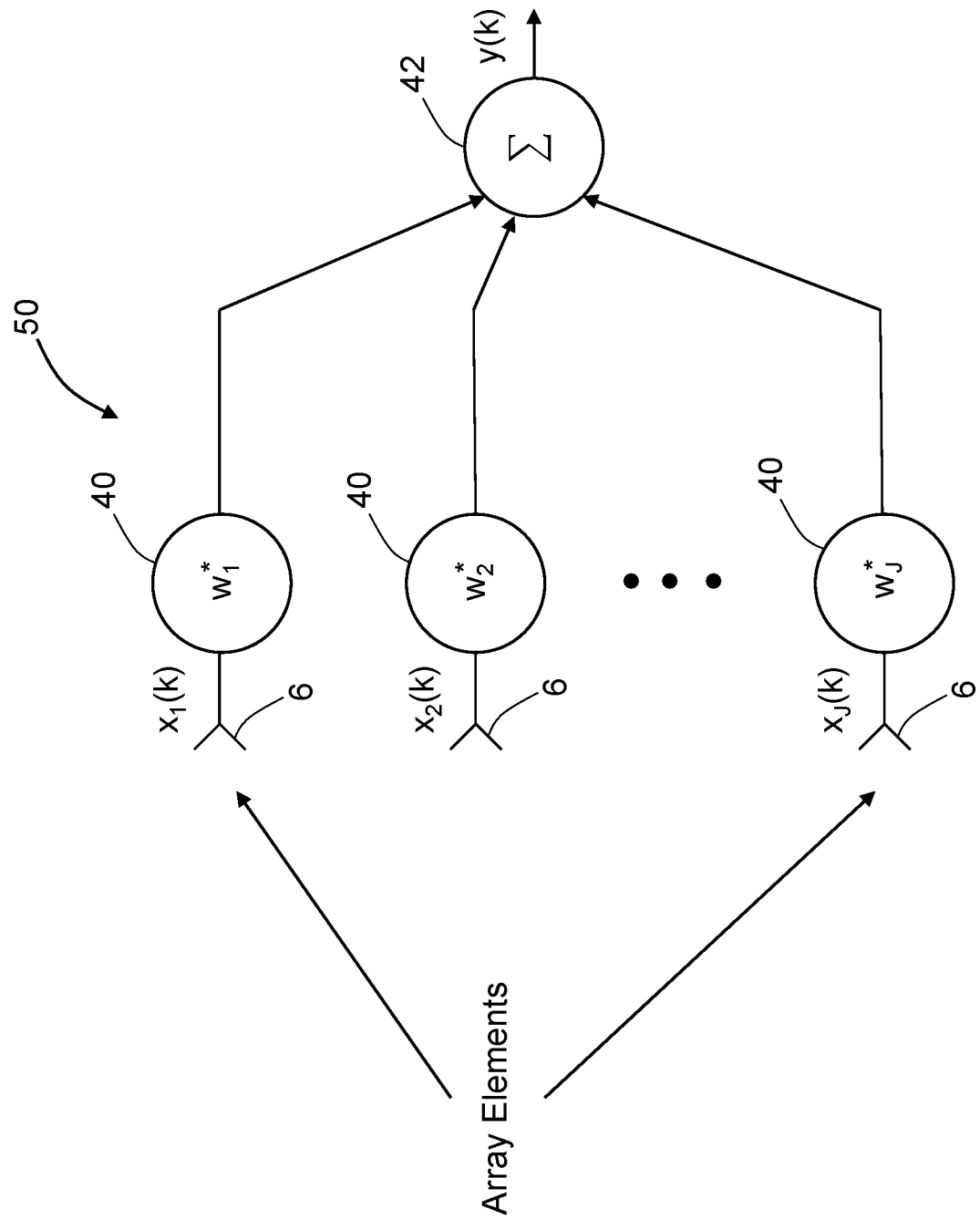

FAST SPATIAL SEARCH USING PHASED ARRAY ANTENNAS

BACKGROUND

The technology disclosed herein generally relates to phased array antennas. In particular, the technology disclosed herein relates to methods for searching for signals using a phased array antenna.

Modern phased array antennas are a technology enabler to support mobile broadband communications via satellites, aircraft, ships and land vehicles. In particular, advanced digital beamforming is required to provide dynamic, high-throughput robust communications and networking with larger phased array antennas through improved sidelobe performance and grating lobe suppression, faster nulling for jamming, faster scanning and faster beam switching to enhance network performance. Thus, there are many different applications for beam search, whether it is for connecting a mobile network, finding new radars, providing robust handoffs when switching satellites or cell towers, etc. As used herein, the term "beam search" refers to searching for signals using beams (not searching for beams).

At the heart of beam search is the process of beamforming. Beamforming is a signal processing technique used in antenna arrays for directional signal transmission or reception. This is achieved by combining signal elements in an antenna array in such a way that signals at particular angles experience constructive interference while others experience destructive interference. These are typically called phased array antennas. The improvement compared with omni-directional reception and/or transmission is known as the directivity of the array and is an important measure of the performance of the antenna. Beamforming can be used for radio-frequency (RF) or sound waves and has many applications in radar, sonar, seismology, wireless communications, radio astronomy, acoustics and biomedicine. Conventional time-delay beam steering takes a pointing direction (referred to herein alternatingly as "angle of the boresight" or "pointing angle") and produces settings on the antenna array so that signal transmission or reception towards the pointing direction is maximized and a narrow beam is formed. The mechanism used to effect beamforming is to adjust the phase (or time delay) and amplitude (or weight) separately at each element to force the constructive or destructive signal summation to produce the desired beam.

Existing solutions to beam search using phased arrays imitate a mechanical dish in their method to search for signals. Thus, these solutions sweep a single narrow beam over the field-of-view F of the array. This means that the sweep time increases linearly with the size of the array (total number of elements) since the beam must eventually point to every angular region in the field-of-view. To see this, note that the first null beamwidth of a linear array with N elements with wavelength $\lambda$ and $d=\lambda/2$ element spacing is approximately $4/N$ in radians. Similar approximations show that for a planar array of size $N_1 \times N_2$, the angular area is approximately the product of the linear array beamwidths, e.g., $16/(N_1 N_2)$ in steradians. Thus, the time for a complete search of F is approximately span(F)*N/4 for linear arrays and approximately area(F)*$N_1 N_2$/16 for planar arrays. Here span( ) denotes the angular range in radians and area( ) denotes the two-dimensional solid angular range in steradians.

A solution to the problem of how to rapidly find all detectable signals within the field-of-view of a phased array antenna would be beneficial.

SUMMARY

The subject matter disclosed in detail below is directed to systems and methods for rapidly finding detectable signals within the field-of-view of a phased array antenna. The transmit beam pattern is modified over time to increase signal spatial search performance over typical time-delay steering by producing a coarse-to-fine angular beam pattern with a tree-based approach to signal detection. More specifically, a tree-based beam search is employed to select a beam having a narrower beamwidth for transmission at an angle from boresight that lies in an angular space where a signal has been previously detected.

In accordance with one embodiment, a complementary beam set having multiple levels is designed. The number of beams in the subset making up each level increases as the level increases. The levels of complementary beams are then loaded into a beam steering controller that controls the beams created by the phased array antenna. A signal detection happens when the value of a parameter of the signal detected rises above a threshold. For example, the parameter detected may be the sum of the energy in the signal. Many other detection schemes are possible as well. As the level increases, the gain of each beam filter increases and the beamwidth decreases. Thus, signals are put through more spatial filters, narrowing down the possible signal directions, while simultaneously increasing the received signal power. This has the twin effects of (1) finding more signals in (2) narrower angular regions.

As mentioned above, typical phased antenna arrays imitate a mechanical dish in their method for searching for signals. Thus, a respective narrow beam is created for each commanded angle using a phased array antenna. In contrast, the beam search methodology disclosed herein allows the beam pattern to be modified over time to increase signal spatial search performance over typical time-delay steering. This approach uses more of the capability of a phased array than is typically used for beam search. A dimensionality argument shows this clearly. If a simple angular search using a single beam were swept across the field-of-view of a phased array antenna having N elements, the phase and amplitude controls only vary within a one-dimensional (two-dimensional) space for linear (planar) arrays having azimuth (and elevation) angular control over the beam. Thus, only N−1 (N−2) dimensions would be used during search to create narrow beams. In contrast, the system proposed herein uses more dimensions for the search because the width of the beam as well as the pointing angle are increased. Thus, the system proposed herein uses up to twice as many array dimensions for search. This allows a trade-off of directivity with search time in an efficient way.

The beam search methodology (hereinafter "tree beam search") proposed herein has the following noteworthy features: (1) Performing a tree beam search using a phased array antenna enables all signals within the field-of-view (on average) to be found in a time which is proportional to D $\log_2(N)/2$, where D is the time to detect a single signal. This is much faster than traditional approaches in which the time is proportional to DN/2 on average. (2) By searching the signal space faster, the probability of transient signal detection is increased. Specifically, the system is able to detect shorter-duration signals more reliably. For example, while standard search techniques detect all signals having a time duration DN, the method proposed herein is able to detect most signals having a time duration D $\log_2(N)$.

The features described in the immediately preceding paragraph provide benefits to the phased array antenna system by increasing search performance without increasing antenna size or number and without improving RF receiver performance, which options are expensive and fraught with problems. The approach adopted herein employs more robust beamforming and beam steering than typical phased antenna arrays employ and may be implemented using commercially available field-programmable gate arrays (FPGAs) and electronics.

Although various embodiments of systems and methods for rapidly finding detectable signals using within the field-of-view of a phased array antenna will be described in some detail below, one or more of those embodiments may be characterized by one or more of the following aspects.

One aspect of the subject matter disclosed in some detail below is a method for searching for signals using a phased array antenna, the method comprising: (a) transmitting a first beam having a first beamwidth and a first angle from boresight; (b) receiving a first signal following transmitting of the first beam; (c) detecting that a value of a parameter of the first signal exceeds a first threshold; (d) transmitting a second beam having a second beamwidth which is less than the first beamwidth and a second angle from boresight disposed within an angular range of the first beam; and (e) transmitting a third beam having the second beamwidth and a third angle from boresight disposed within the angular range of the first beam, wherein the first angle from boresight is disposed between the second and third angles from boresight. In accordance with some embodiments, the second beamwidth is equal to one-half of the first beamwidth and total angular range of the second and third beams is coextensive with the angular range of the first beam.

The method described in the immediately preceding paragraph may further comprise: (f) receiving a second signal following transmitting of the second beam; (g) detecting that a value of a parameter of the second signal exceeds a second threshold; (h) transmitting a fourth beam having a third beamwidth which is less than the second beamwidth and a fourth angle from boresight disposed within an angular range of the second beam; and (i) transmitting a fifth beam having the third beamwidth and a fifth angle from boresight disposed within the angular range of the second beam, wherein the second angle from boresight is disposed between the fourth and fifth angles from boresight. The first through fifth beams are selected from a complementary beam set that has L levels comprising a first level having M beams and including the first beam, a second level having 2M beams and including the second and third beams, a third level having 4M beams and including the fourth and fifth beams, and an L-th level having $2^{L-1}$M beams. wherein L and M are integers.

Another aspect of the subject matter disclosed in some detail below is a method for searching for signals using a phased array antenna, the method comprising: designing a complementary beam set having L levels; loading the L levels of the complementary beam set into a beam steering controller that controls the beams created by a phased array antenna; marking a beam (b, l) in the complementary beam set for transmission; setting the phases and amplitudes of antenna elements of the phased array antenna to transmit the marked beam having a beamwidth and a pointing angle; transmitting the marked beam; following transmission of the marked beam, receiving a signal at the phased array antenna; detecting when a value of a parameter of the received signal indicates that a signal was received; determining whether the current level l is less than the total number of levels L or not; if the current level l is not less than the total number of levels L, then declaring that a signal has been detected with a direction of arrival which corresponds to the pointing angle for the current beam; if the current level l is less than the total number of levels L, then two beams (2b−1) and 2b in the next level (l+1) corresponding to the current beam at level l of the complementary beam set are marked for transmission; setting the phases and amplitudes of antenna elements of the phased array antenna to transmit the two beams; and transmitting the two beams in succession. In accordance with one proposed implementation, the complementary beam set has L levels comprising a first level having M beams, a second level having 2M beams, a third level having 4M beams and an L-th level having $2^{L-1}$M beams, wherein M and L are integers. The method may further comprise: marking a subset of additional beams from the L-th level in order to fill in search gaps for a current search frame; and setting the phases and amplitudes of antenna elements of the phased array antenna to transmit the additional beams.

A further aspect of the subject matter disclosed below is a system comprising: a phased array antenna; a transmitter; a receiver; a transmit module that connects the transmitter to the phased array antenna in a transmit mode and connects the receiver to the phased array antenna in a receive mode; a beam steering controller configured to control the phased array antenna to transmit beams having beamwidths and angles from boresight which are determined by a tree-based beam search; a beam search controller configured to send commands to the transmitter and beam steering controller, which commands cause beams selected by a tree-based beam search to be transmitted by the phased array antenna; and a complementary beam set data storage medium storing data representing specifications of beams of a complementary beam set organized in L levels, wherein the complementary beam set data storage medium is accessible by both the beam search controller and the beam steering controller, the beam search controller is further configured to mark selected beams specified in the complementary beam set data storage medium, and the beam steering controller is further configured to control the beams created by a phased array antenna in dependence on beam information read from the complementary beam set data storage medium. The beam search controller comprises a module configured for detecting a particular parameter of signals output by the receiver.

In accordance with some embodiments of the system described in the immediately preceding paragraph, the complementary beam set has L levels comprising a first level having M beams, a second level having 2M beams, a third level having 4M beams and an L-th level having $2^{L-1}$M beams, wherein M and L are integers. The first level includes beams having a first beamwidth, the second level includes beams having a second beamwidth which is less than the first beamwidth, the third level includes beams having a third beamwidth which is less than the second beamwidth, and the L-th level includes beams having an L-th beamwidth which is less than the third beamwidth and less than a beamwidth of any level between the third level and the L-th level.

In accordance with one proposed implementation, the beam search controller is further configured to perform operations comprising: marking a beam (b, l) in the complementary beam set for transmission; detecting when a value of a parameter of a received signal indicates that a signal was received following transmission of the beam; determining whether the current level l to which a transmitted beam belongs is less than the total number of levels L or not; if the current level l is not less than the total number of levels L, then declaring that a signal has been detected with a direction of arrival which corresponds to the pointing angle for the transmitted beam; and if the current level l is less than the total number of levels L, then marking two beams (2b−1) and 2b in the next level (l+1) corresponding to the transmitted beam at level l of the complementary beam set for transmission.

Other aspects of systems and methods for rapidly finding detectable signals within the field-of-view of a phased array antenna are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

FIG. 3 is a diagram showing how a digital beamformer is connected to a multiplicity of elements of a phased array antenna.

Reference will hereinafter be made to the drawings in which similar elements in different drawings bear the same reference numerals.

DETAILED DESCRIPTION

Illustrative embodiments of systems and methods for rapidly finding detectable signals within the field-of-view of a phased array antenna are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

One example embodiment of a method for rapidly finding detectable signals within the field-of-view of a phased array antenna will now be described for the purpose of illustration. For the avoidance of doubt, the principle of operation of a phased array antenna will now be briefly described with reference to FIG. 1.

Figure 1:
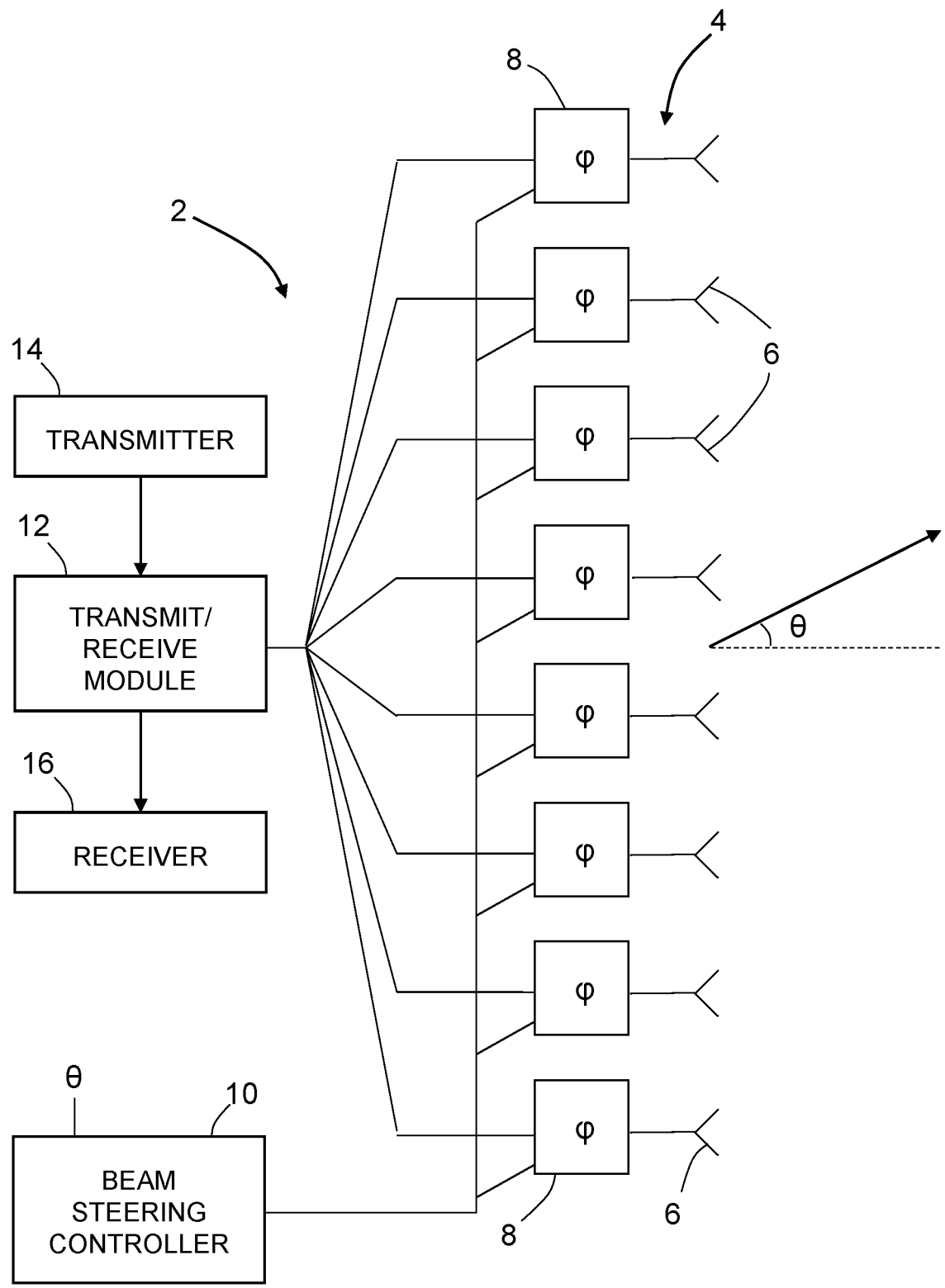
FIG. 1 is a block diagram identifying some components of a typical phased array antenna system.

FIG. 1 is a block diagram identifying some components of a typical phased array antenna system 2. The phased array antenna system 2 includes a phased array antenna 4, a transmitter 14, a receiver 16, and a transmit module 12 that connects the transmitter 14 to the phased array antenna 4 in a transmit mode and that connects the receiver 16 to the phased array antenna 4 in a receive mode. The phased array antenna 4 includes an array of antenna elements 6 and a corresponding array of phase shifters 8. The feed current for each antenna element 6 passes through a respective phase shifter 8 ($\varphi$) controlled by a beam steering controller 10. The beam steering controller 10 is a computer configured (e.g., programmed) to control the phase shifters 8 in a manner such that the antenna elements 6 emit respective RF waves that combine to produce a transmit beam having a pointing angle $\theta$. The individual wavefronts are spherical, but they combine (superpose) in front of the phased array antenna 4 to create a plane wave travelling in a specific direction. The phase shifters 8 delay the RF waves so that each antenna element 6 emits its wavefront later than the antenna element before it. This causes the resulting plane wave to be directed at an angle $\theta$ to the antenna's axis (a.k.a. boresight). By changing the phase shifts, the beam steering controller 10 can instantly change the angle $\theta$ of the transmit beam. Most phased arrays have two-dimensional arrays of antenna elements instead of the linear array shown in FIG. 1, in which cases the transmit beam can be steered in two dimensions. The receive beam is similarly formed by controlling the phase shifts to combine wavefronts returning from the pointing angle.

In telecommunications and radar engineering, antenna boresight is the axis of maximum gain (maximum radiated power) of a directional antenna. For most antennas the boresight is the axis of symmetry of the antenna. For example, for axial-fed dish antennas, the antenna boresight is the axis of symmetry of the parabolic dish, and the antenna radiation pattern (the main lobe) is symmetrical about the boresight axis. Phased array antennas can electronically steer the transmit beam, changing the angle of the boresight (a.k.a. pointing angle) by shifting the relative phase of the RF waves emitted by different antenna elements 6. As used herein, the term "beamwidth" means the angle between the half-power (−3 dB) points of the main lobe, when referenced to the peak effective radiated power of the main lobe.

Figure 2:
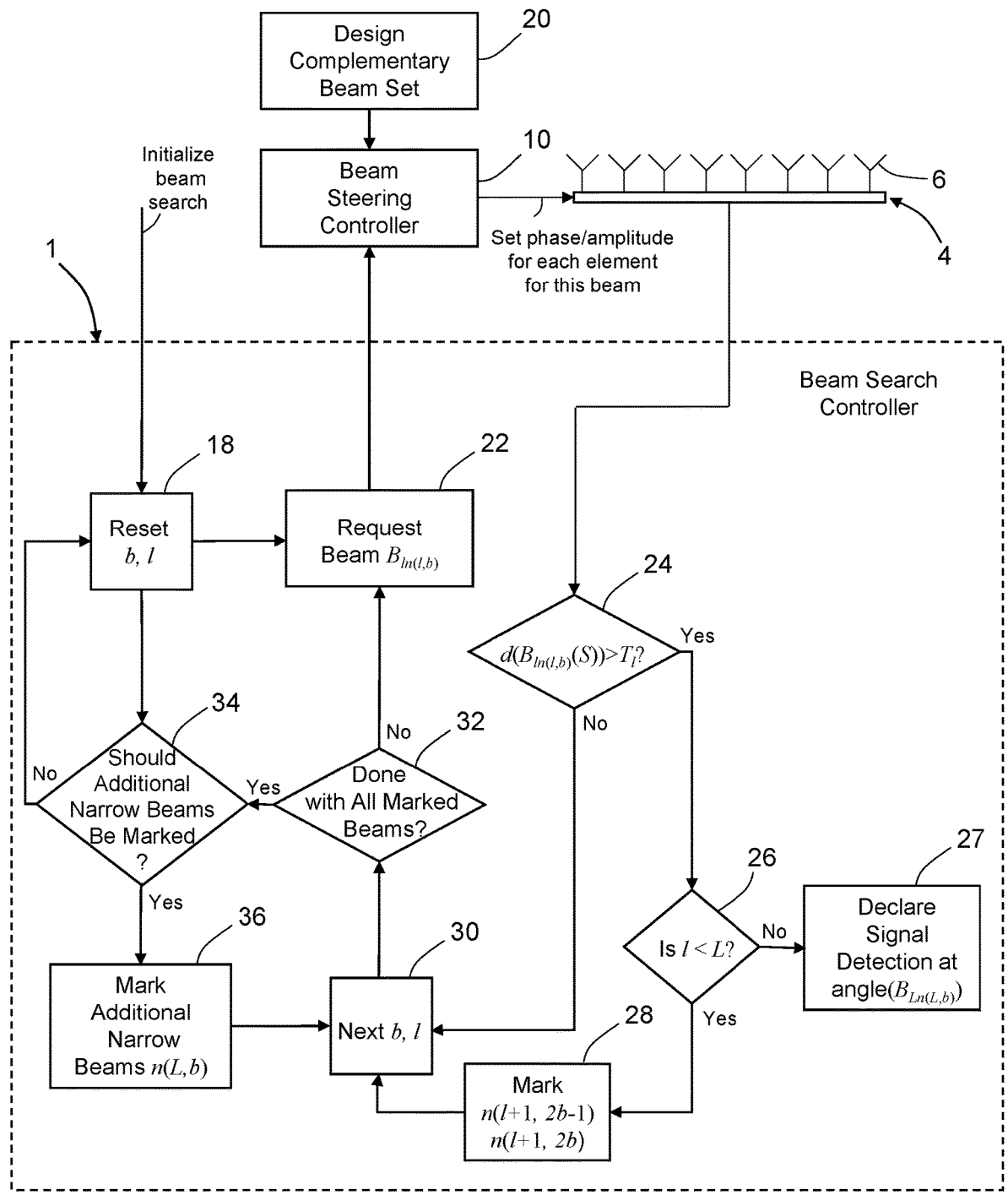
FIG. 2 is a flowchart identifying steps of a method for performing a tree beam search using a phased array antenna in accordance with one embodiment.

The beam search methodology disclosed herein allows the beam pattern produced by a phased array antenna system 2 to be modified over time to increase signal spatial search performance over typical time-delay steering by producing a coarse-to-fine angular beam pattern with a tree-based approach to signal detection. FIG. 2 is a flowchart identifying steps of a method for performing a tree beam search using a phased array antenna 4 in accordance with one embodiment including marking selected beams to be transmitted and then using a phased array antenna 4 to transmit the marked beams. The steps depicted in FIG. 2 are performed under the control of a beam search controller 1, which is communicatively coupled to the beam steering controller 10. The beam search controller 1 is a computer or processor configured (e.g., programmed) to send commands to the beam steering controller 10. The beam steering controller 10 in turn is a computer or processor configured (e.g., programmed) to control the phased array antenna 4 to transmit marked beams having beamwidths and angles from boresight which are determined by the tree-based beam search.

In accordance with the implementation depicted in FIG. 2, a complementary beam set 20 having L levels is designed.

Beam patterns are predesigned so that: level 1 has M beams; level 2 has 2M beams wherein each pair of beams fits within a corresponding beam of the beam pattern from level 1; level 3 has 4M beams wherein each pair of beams fits within a corresponding beam of the beam pattern from level 2; and so forth. As used herein, "fits" means that the respective angular ranges of a pair of beams in one level overlap respective portions of and fit within the angular range of the corresponding wider beam in the next lower level, and further means that the angle from boresight of the wider beam in the next lower level lies between the respective angles from boresight of the pair of beams. This can be accomplished using filter design techniques and is described in more detail below. Each beam in the beam set is identified by a "marking" denoted by n(l, b), which indicates the b-th marked beam at level l.

The L levels of complementary beams are then loaded (e.g., in the form of a data table) into a non-transitory tangible computer-readable storage medium (not shown in FIG. 2, but see complementary beam set data storage medium 11 in FIG. 8) which is accessible by both the beam search controller 1 and the beam steering controller 10. The beam search controller 1 is configured to mark selected beams specified in the complementary beam set data storage medium 11, while the beam steering controller 10 is configured to control the beams created by a phased array antenna 4 in dependence on beam information read from the complementary beam set data storage medium 11. More specifically, the beam steering controller 10 sets the phase delays for each antenna element 6 of the phased array antenna (as previously described with respect to FIG. 1) and also sets the weightings which are used to adjust the amplitudes of the wave fronts emitted by antenna elements 6.

In response to initialization of a beam search for a new search frame, the beam search controller 1 resets the beam index b and the level index l (operation 34 in FIG. 2). Those indices (which identify a marked beam to be transmitted) are included in a transmit beam request 22 that is sent to the beam steering controller 10. The beam steering controller 10 then sets the phases and amplitudes of the antenna elements 6 so that a marked beam having a specified beamwidth and a specified angle from boresight will be transmitted.

Following the transmission of a programmed beam, a signal S is received by the phased array antenna 4. The signal received following transmission of programmed beam $B_{ln(l,b)}$ at level l is denoted herein by $B_{ln(l,b)}(S)$. The beam search controller 1 is further configured to detect when the value of a signal parameter indicates that a signal (not noise) was received. To detect the value of a parameter (e.g., energy) of the received signal $B_{ln(l,b)}(S)$, beam search controller 1 uses a chosen detection algorithm d( ) with a threshold $T_l$ for that level l. More specifically, a determination is made whether the detected value of the parameter is greater than a threshold $T_l$:

$$d(B_{ln(l,b)}(S)) > T_l?$$

or not (operation 24 in FIG. 2). If a determination is made that the parameter value of the received signal is above the threshold $T_l$, then a further determination is made whether the current level l is less than the total number of levels L or not (operation 26). On the one hand, if the current level l is not less than the total number of levels L (e.g., l=L), then a signal detection above threshold results in the system declaring (operation 27) that a signal has been detected with a direction of arrival which corresponds to the pointing angle for the current beam $B_{ln(l,b)}$.

On the other hand, if the current level l is less than the total number of levels L, then the two beams (2b−1) and 2b in the next level (l+1) corresponding to the current beam at level l are marked for usage (operation 28). Digital data representing the markings n(l+1, 2b) and n(l+1, 2b−1) are then stored in a first-in first-out buffer 30. The beam search controller 1 then determines whether the beam search is done with all marked beams or not (operation 32). If all marked beams at every level have been emitted, the beam search controller 1 then determines whether to mark a subset of additional narrow beams in order to fill in search gaps for the current search frame.

On the one hand, if a determination is made (in operation 32) that the beam search is not done with all marked beams, then the beam index b and the level index l (which identify the next marked beam to be transmitted) are included in a transmit beam request 22 that is sent to the beam steering controller 10. The transmit beam request 22 identifies the next beam $B_{ln(l,b)}$ to be transmitted under the control of the beam steering controller 10. The beam steering controller 10 then sets the phases and amplitudes of the antenna elements 6 so that the next marked beam in the complementary beams set 20 will be transmitted.

On the other hand, if a determination is made (in operation 32) that the beam search is done with all marked beams for the current search frame, the beam search controller 1 then determines whether the beam search should include additional narrow beams (e.g., beams having a beamwidth equal to the beamwidth of the beams in the last level L) or not (operation 34).

On the one hand, if a determination is made (in operation 34) that additional narrow beams should not be added for the current search frame, then the beam search controller 1 resets and initiates a beam search for a new search frame (operations 18 and 22 respectively).

On the other hand, if a determination is made (in operation 34) that additional narrow beams should be added for the current search frame in order to fill in search gaps for the current search frame, the beam search controller 1 then marks a subset of additional narrow beams. These additional narrow beams are marked at the end of a beam search frame for which all marked beams have already been processed. The reason for choosing to mark additional narrow beams to complete the search frame is to handle the cases where a received signal is only detectable using the narrowest beams (with the correspondingly highest gains) and hence could be missed by the efficient tree search. There are $M_L = 2^{L-1}M$ possible beams at the last (narrowest beam) level L for a binary search tree with $\{n(L,b)\}_{b=1}^{N_L}$ being the set of $N_L$ marked beams at this level. There are $t = 1/R - (M_1 + M_2 + \ldots + M_L)D$ seconds left in a search frame under the previous assumptions, where R is the search frame rate in frames per second. Thus, there is room for t/D extra beams every frame. The way additional marking works (this is assuming a desired fixed search frame rate of R frames per second with desired constant beam dwell time D) is as follows:

Frame $F_1$ would mark the first set of m=t/D beams taken consecutively from the full set of $M_L - N_L(F_1)$ of unmarked narrow beams (designated $U(F_1) = \{u_1, u_2, \ldots\}$) at level L for frame $F_1$. Call this marked set $A(F_1)$ $\{u_1, \ldots, u_m\}$.

Frame $F_2$ would mark the next set of m beams taken consecutively from the unmarked narrow beams at level L for this frame $F_2$, designated $U(F_2)$, minus those in $A(F_1)$, denoted $U(F_1)(F_2)$. Call this set $A(F_2)$.

This process continues from frame to frame until the set of unmarked beams minus the additional marked beams U(F)\(F)\(F_2) . . . is empty. Then the process of additional narrow beam marking starts over again.

Simple modifications to this scheme are easy to design with non-constant search frame rate and non-constant beam dwell time. The following disclosure describes complementary beam set design and FIR filter design.

FIG. 3 is a diagram showing how a digital beamformer 50 is connected to J antenna elements 6 of a phased array antenna, where J is an integer greater than unity. The digital beamformer 50 includes a multiplicity of multipliers 40 which apply respective weights to the respective signals output by the multiplicity of antenna elements 6. The signals output by the multipliers 40 are summed by a summer 42. The output y(k) at time k, given by a linear combination of the data at the J antenna elements 6 at time k, is:

$$y(k) = \sum_{j=1}^{J} w_j^* x_j(k) = w^H x(k)$$

where ( )* represents complex conjugation. This is the transmit mode pictured. The receive mode is exactly the opposite, where an incoming signal y(k) produces a set of signals {x_j(k)}, one at each of the J antenna elements 6. Although not explicitly reiterated hereinafter, the dependence on time k should be understood in what follows.

Figure 4A:
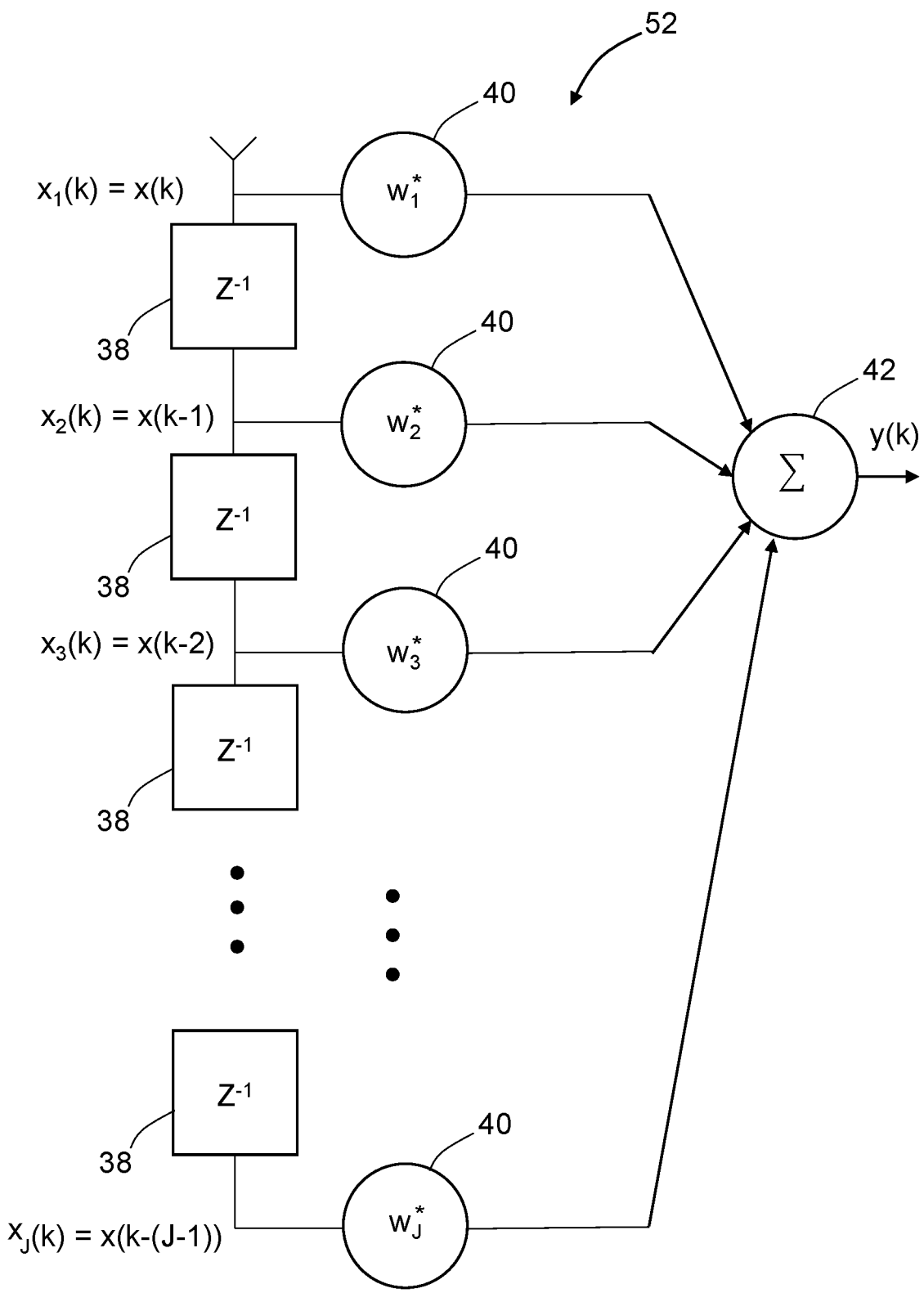
FIGS. 4A and 4B are respective diagrams showing the analogy between a single-channel finite impulse response (FIR) filter (see FIG. 4A) and an equispaced omnidirectional narrow-band line array (see FIG. 4B).
Figure 4B:
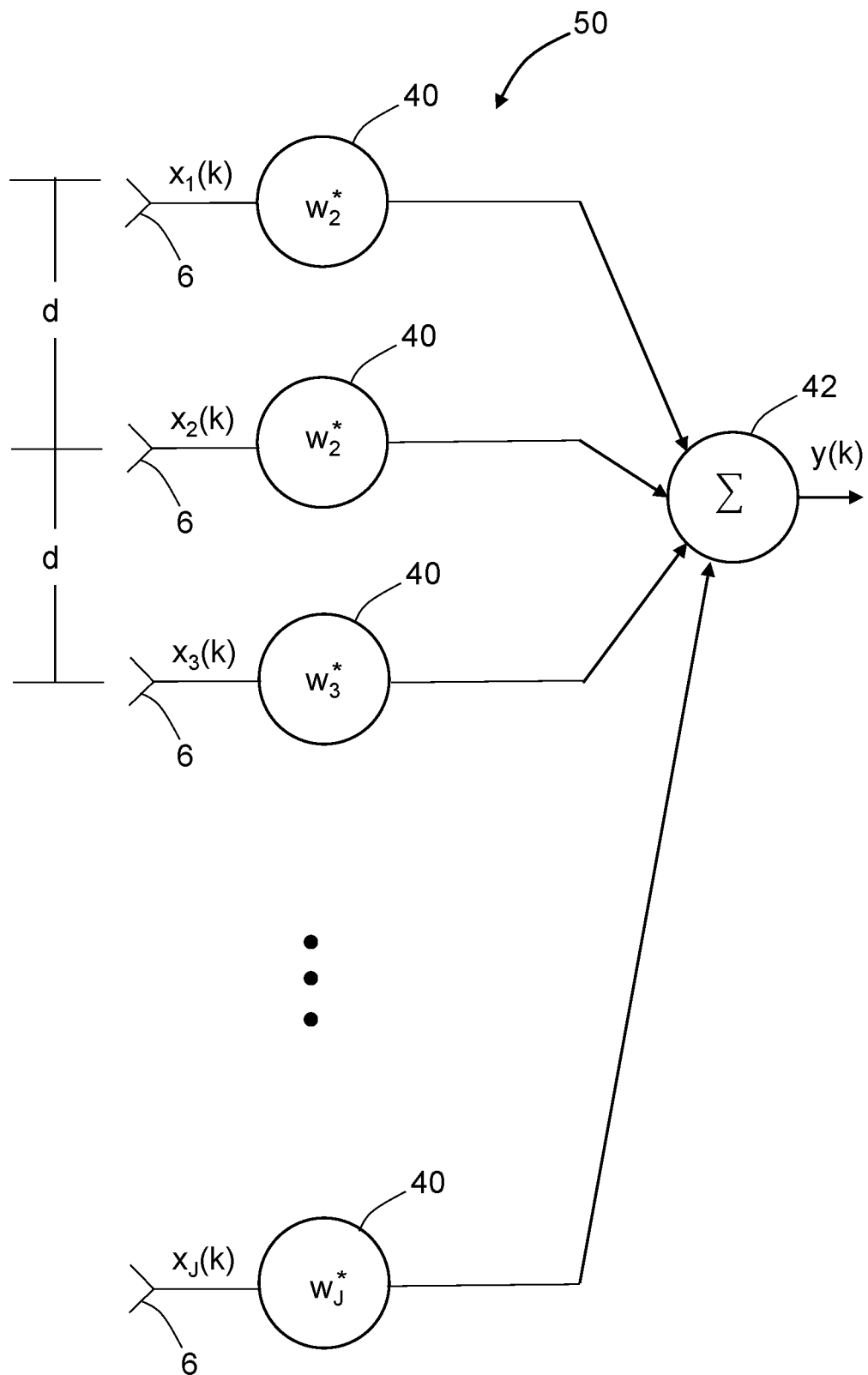

FIGS. 4A and 4B are respective diagrams showing the analogy between a single-channel finite impulse response (FIR) filter 52 (see FIG. 4A) and a beamformer 50 in the form of an equispaced omnidirectional narrow-band line array (see FIG. 4B).

Referring to FIG. 4A, the FIR filter 52 includes a multiplicity of elements weights applied by multipliers 40 to produce weighted signals, which are in turn summed by a summer 42. Each square labeled $Z^{-1}$ denotes a register or memory element which serves to delay a value by one clock period. Thus, each multiplier receives the incoming signal after delays of different durations.

The frequency response of a finite impulse response (FIR) filter with element weights $w_j^*$, $1 \leq j \leq J$, and an element delay of T seconds is given by $$r(w) = \sum_{j=1}^{J} w_p^* e^{-i\omega T(j-1)} = w^H d(\omega) \quad (1)$$

This equation represents the response of the filter to a complex sinusoid of frequency ω. Here $$d(\omega) = [1 \, e^{i\omega T} e^{i\omega 2T} e^{i\omega T(j-1)}]^H$$

is a vector describing the phase of the complex sinusoid at each tap in the FIR filer relative to the tap associated with frequency ω. Here $i = \sqrt{-1}$.

Referring to FIG. 4B, assume that an incoming signal is a complex plane wave with a direction of arrival δ and frequency ω. Then the formula for r(w, ω) changes from $w^H d(\omega)$ to $r(w, \omega) = w^H (d(\omega) \circ d'(\theta, \omega))$.

Here $$d'(\omega) = [d_1(\theta, \Omega)), d_2(\delta, \omega)), \ldots, d_J(\delta, \omega)]$$

and $$d_j(\theta, \omega) = e^{-i\omega \Delta_j(\theta)},$$

where $1 \leq j \leq J$ and $\Delta_j(\theta)$ represents the time delay due to the propagation time from the first to the j-th element at an incoming angle of θ. The notation ∘ is the usual Hadamard elementwise product.

The correspondence between FIR filtering and beamforming is closest when the beamformer operates at a single temporal frequency ω and the array geometry is linear and equispaced as in the case of a uniform linear array. Let the sensor spacing be d; let the propagation velocity (speed of light) be c; and let θ represent the direction of arrival relative to boresight (perpendicular to the array). Then the time delay due to the propagation from the first to the j-th sensor is given by the following equation:

$$\tau_j(\delta) = (j-1)(d/c)\sin(\theta)$$

In this case, the relationship between temporal frequency ω in the term d(ω) (FIR filter) and direction θ in the term d(θ, $\omega_0$) (beamformer) as $$\omega = \omega_0 (d/c) \sin(\theta).$$

Thus, temporal frequency in an FIR filter corresponds to the sine of direction in a narrow-band uniform linear array used as a beamformer.

Figure 5A:
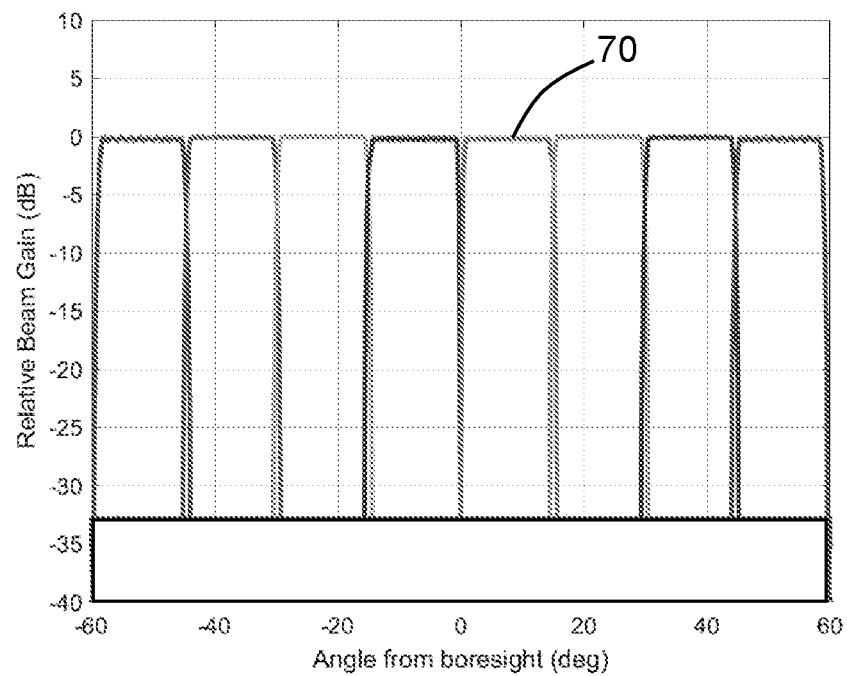
FIGS. 5A-5C are graphs of relative beam gain versus pointing angle.
Figure 5B:
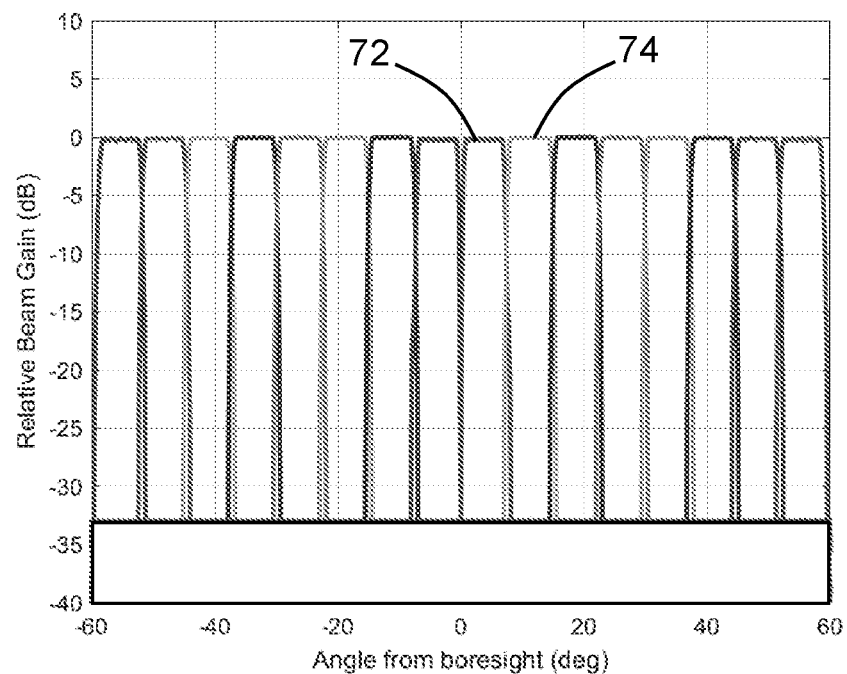
Figure 5C:
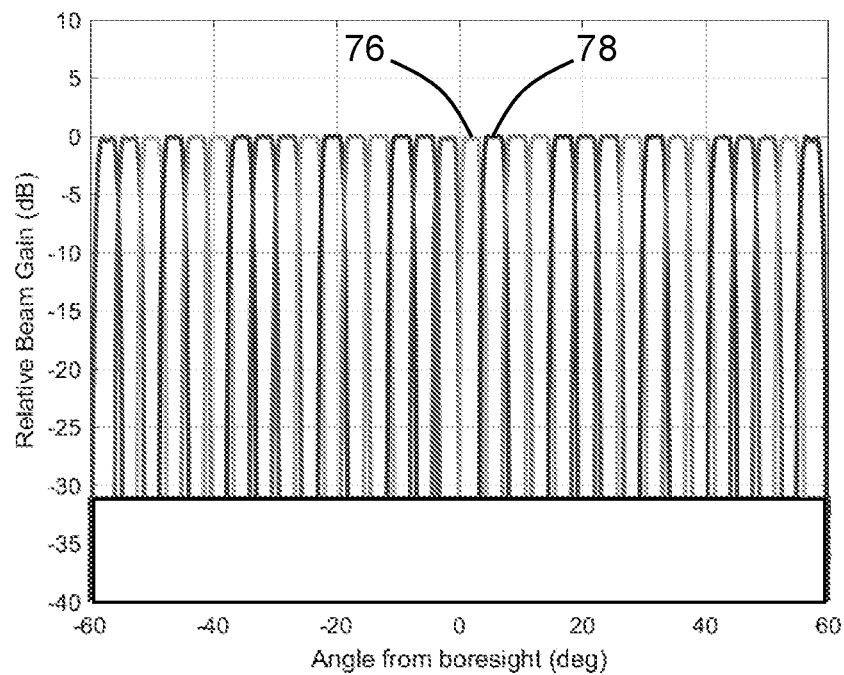

FIGS. 5A-5C are graphs of relative beam gain versus pointing angle, which graphs partially illustrate the design of complementary spatial filters for an array having N=256 elements and a beam tree having five levels (with corresponding numbers of beams) across the angular space from −60° to +60° for a uniform linear array. What is shown is relative gain (forcing all beams to have maximum gain of 0 dB). This helps to show how these spatial filters fit together to divide space into equally spaced angular regions that can be traversed in a tree fashion.

FIG. 5A shows relative beam gain versus pointing angle for the first level consisting of eight beams, each of the eight beams having a beamwidth equal to approximately 15°. FIG. 5B shows relative beam gain versus pointing angle for the second level consisting of 16 beams, each of the 16 beams having a beamwidth equal to approximately 7.5°. FIG. 5C shows relative beam gain versus pointing angle for the third level consisting of 32 beams, each of the 32 beams having a beamwidth equal to approximately 3.75°. Similar graphs for the fourth and fifth levels having 64 beams (each having a beamwidth equal to approximately 1.875°) and 128 beams (each having a beamwidth equal to approximately 0.9375°) respectively are not shown because, when depicted in a black-line drawing, the numerosity of beams makes it difficult to decipher individual beams and thus such a graph would not enhance the reader's understanding.

For example, assume that beam search controller 1 causes the beam steering controller 10 to transmit beam 70 from the first level (seen in FIG. 5A), which beam 70 has an angular range from 0° (corresponding to the boresight) to +15°. After beam 70 from the first level (seen in FIG. 5A) has been transmitted, assume further that the detected parameter of the received signal is greater than the detection threshold for the first level. The system processes that sensor data and determines that the detected signal arrived at an angle which lies in the angular range from 0° to +15°.

The beam search controller 1 then causes the beam steering controller 10 to transmit beams 72 and 74 from the second level (seen in FIG. 5B), which beams 72 and 74 have respective angular ranges from 0° to +7.5° and from 7.5° to +15°. After beam 72 from the second level (seen in FIG. 5B) has been transmitted, assume further that the detected parameter of the signal received following transmission of beam 72 is greater than the detection threshold for the second level. The system processes that sensor data and determines that the detected signal arrived at an angle which lies in the angular range from 0° to +7.5°.

The beam search controller 1 then causes the beam steering controller 10 to transmit beams 76 and 78 from the third level (seen in FIG. 5C), which beams 76 and 78 have respective angular ranges from 0° to +3.75° and from +3.75° to 7.5°. After beam 76 from the third level (seen in FIG. 5C) has been transmitted, assume further that the detected parameter of the signal received following transmission of beam 76 is greater than the detection threshold for the third level. The system processes that sensor data and determines that the detected signal arrived at an angle which lies in the angular range from 0° to +3.75°.

The beam search controller 1 then causes the beam steering controller 10 to transmit two beams from the fourth level (not shown in the drawings). This process continues at least until two beams have been transmitted from the last level. If one of those beams results in a received signal having a detected parameter greater than the detection threshold for the last level, then the system processes that sensor data and determines that the detected signal arrived at an angle which lies in the angular range from 0° to +0.9375°, for example. In this manner, the direction of arrival of a signal from a target object may be determined.

Figure 6A:
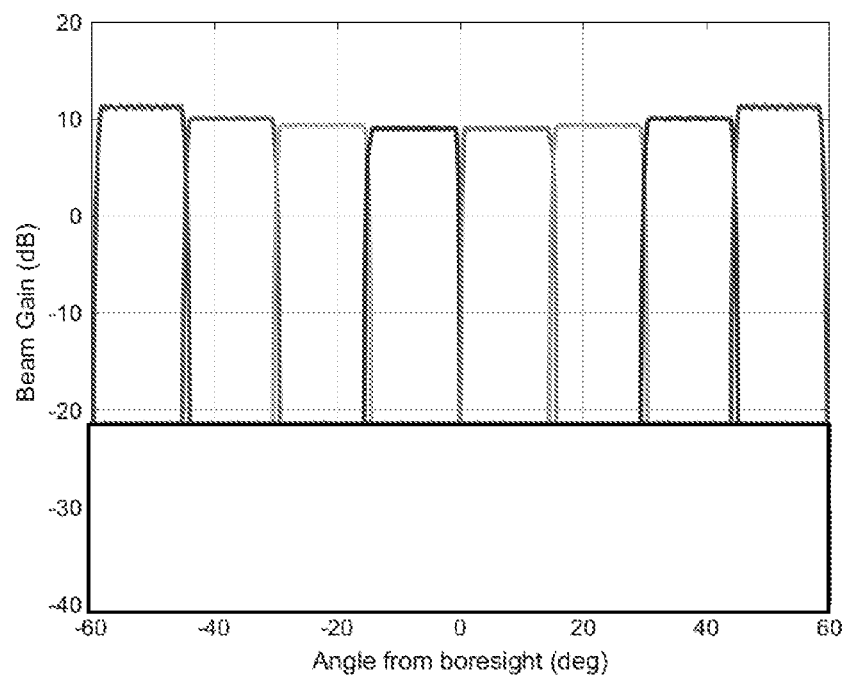
FIGS. 6A-6C are graphs of absolute beam gain versus pointing angle.
Figure 6B:
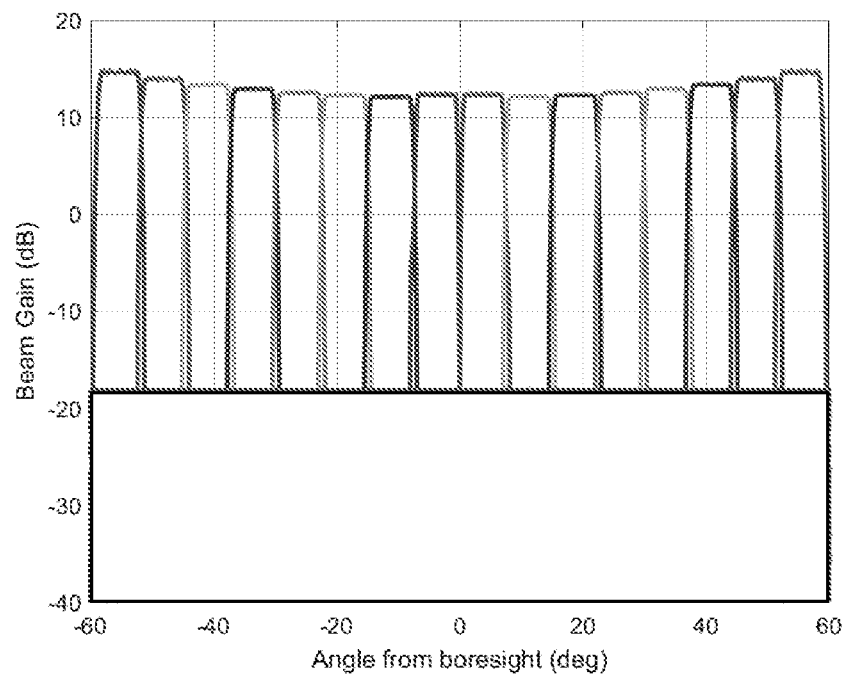
Figure 6C:
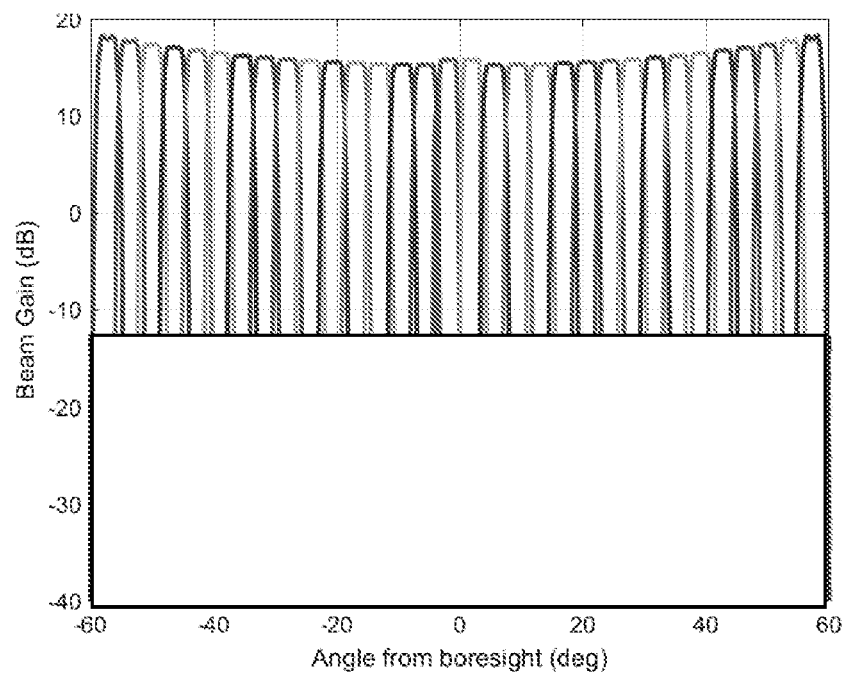

FIGS. 6A-6C are graphs of absolute beam gain versus pointing angle, which graphs partially illustrate the design of complementary spatial filters for an array having N=256 elements and a beam tree having five levels (with corresponding numbers of beams) across the angular space from −60° to +60° for a uniform linear array. FIG. 6A shows absolute beam gain versus pointing angle for the first level consisting of eight beams; FIG. 6B shows absolute beam gain versus pointing angle for the second level consisting of 16 beams; and FIG. 6C shows absolute beam gain versus pointing angle for the third level consisting of 32 beams. Similar graphs for the fourth and fifth levels having 64 and 128 beams respectively are not shown.

While the sidelobes are kept under control (the sidelobes are typically 30 dB below the main beam or even more) through the FIR filter design methodology used, what is sacrificed is the maximum gain. With N=256 elements, the maximum gain possible is 48 dB=20 $\log_{10}(N)$. This is far above the maximum gain in the level 5 graph (not shown in the drawings), which is only about 23 dB. This is because the constrained design techniques which keep the sidelobe level under control also reduce the maximum gain. By unconstraining the sidelobes, one can achieve the maximum gain. The sidelobes are much higher than those complementary beam sets designed using constrained techniques. Also, the gain of each beam shows differences across the field-of-view. These differences can be easily corrected through amplitude adjustment of the element weights.

FIR filter design is a vast area with many possible techniques. Rather than describe all the many ways filter design is accomplished (optimization, frequency methods, Remez, etc.), this disclosure will describe one approach for reference. Filter design uses either real or complex methods and is for FIR or infinite impulse response filters. Since the process of interest is antenna beamforming, complex FIR filter design techniques are used. Specifically, complex approximation is used for the design of filters with nonlinear phase characteristics such as beamforming. The frequency response $H(\omega)$ of a length-N FIR digital filter (corresponding to N antenna elements) is in general a complex-valued function of the normalized frequency $\omega$:

$$H(\omega) = \sum_{n=P_1}^{P_2} h(n) e^{-i\omega n} \quad (2)$$

where $P = P_2 - P_1 + 1$. Here the filter coefficients $h(n)_{n=P_1}^{P_2}$ are allowed to be complex numbers and thus represent both an amplitude and phase for each antenna element. The complex Chebyshev approximation problem is stated as follows. Let $D(\omega)$ be a desired continuous complex function defined on a compact subset $B \subset [-\pi, \pi)$. $D(\omega)$ is to be approximated on B by the frequency response in Eq. (2). The approximation problem consists in finding the filter coefficient $$h(n)_{n=P_1}^{P_2}$$

1 that will minimize the Chebyshev norm $$\|E(\omega)\| = \max_{\omega \in B} |E(\omega)|$$

of the weighted error $$E(\omega) = W(\omega)[D(\omega) - H(\omega)] \quad (3)$$

for all possible choices of filter coefficients $\{h(n)\}$. The weighting $W(\omega)$ is a design parameter to trade off ripple versus sidelobe level, etc. There are many algorithms for designing a Chebyshev optimal complex FIR filter. The method used in MATLAB and other current design software will now be described.

By generalizing Remez exchange, an efficient multiple exchange algorithm for the design of complex FIR digital filters in the Chebyshev sense was presented by Karam et al. in "Complex Chebyshev Approximation for FIR Filter Design." IEEE Trans. on Circuits and Systems, Part II, March 1995. This algorithm is basically a generalization of the Parks-McClellan algorithm to the complex case. Specifically, given a set of normalized frequencies, the algorithm converges to the best-weighted Chebyshev approximation on B when the optimal error satisfies a given alternation property and typically converges to the optimal Chebyshev solution on some compact subset of B.

Figure 7:
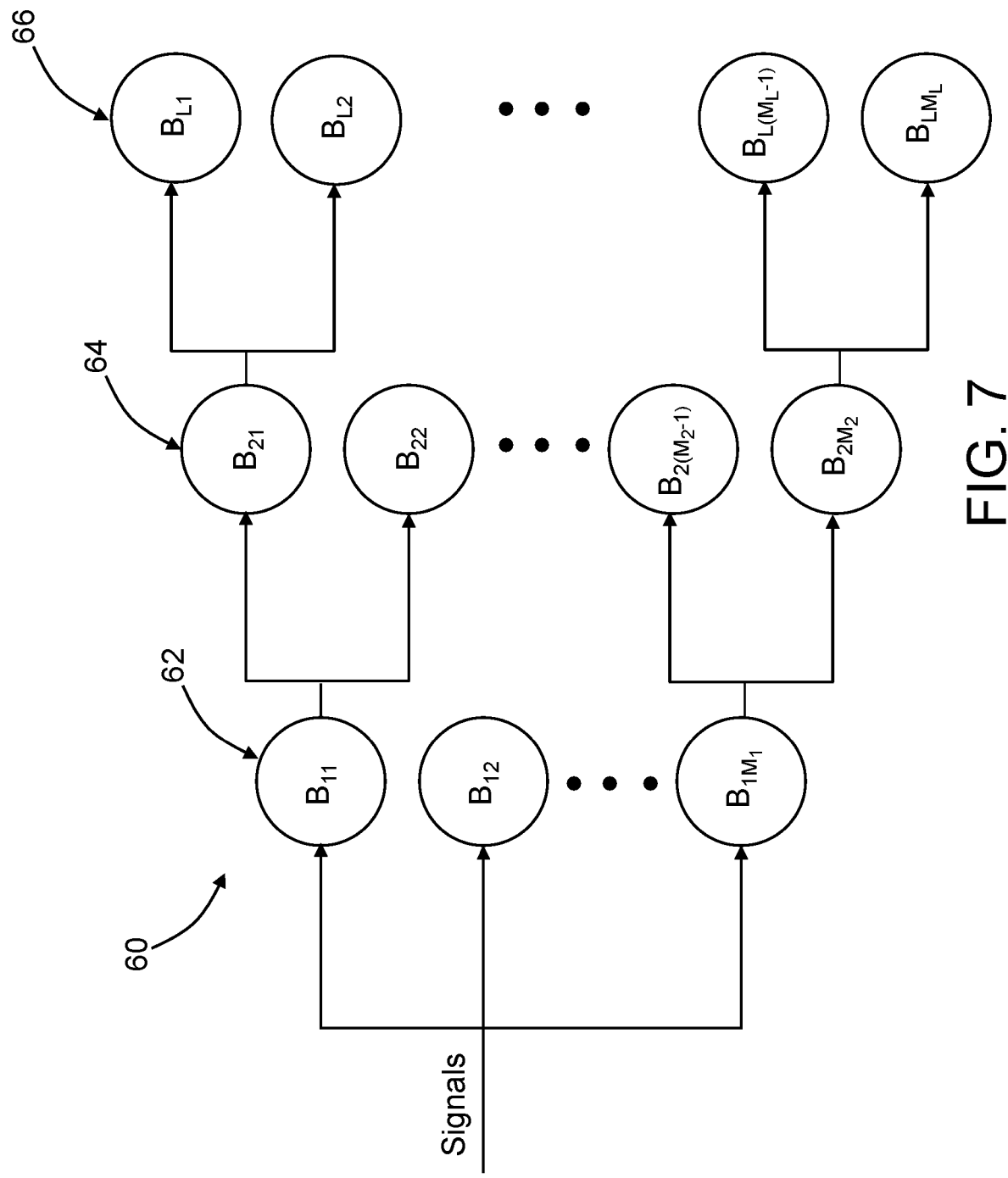
FIG. 7 is a diagram showing a tree for signal detection in a phased array antenna system using beam search methodology.

The methodology proposed herein involves transmitting beams having an angular beam pattern that becomes increasingly fine in accordance with a tree-based approach. Assume that a tree 60 has L levels as shown in FIG. 7. Denote the $M_l = 2^{l-1}M$ beams (or spatial beam patterns) for level l with $1 \leq l \leq L$ by $\{B_{lb}\}_{b=1}^{M_l}$. This number assumes a binary tree. In accordance with one proposed implementation of a binary tree, two branches diverge from each node as shown in FIG. 7. In this case, the tree 60 has $M_1 = M$ beams ($B_{11}$, $B_{12}$, ..., $B_{1M1}$) in the first level 62, $M_2 = 2M$ beams ($B_{21}$, $B_{22}$, ..., $B_{2M2}$) in the second level 64, and $M_L = 2^{L-1}M$ beams ($B_{L1}$, $B_{L2}$, ..., $B_{LML}$) in the last level 66. More branches could be considered as well. A typical application of the tree beam search technology has been described for the purpose of illustration.

For each level l with $1 \leq l \leq L$, a respective detection threshold $T_l$ is chosen so that the probability of a signal detection within each beam is a constant less than unity (for example, if the constant is 0.5, then the number of detected signals remains constant at each level of the binary tree). Notationally, B(S) represents a signal S filtered by a beam spatial filter B (i.e., the resulting transmitted signal S received by the antenna with beam pattern B). The detection of such a signal uses a detection algorithm represented by d( ) so that a signal detection happens when the value of a parameter of the signal detected rises above a threshold. In other words, a detection of a signal S is declared when $$d(B(S)) > T_l$$

for level l. Here a common detection algorithm is the sum of the energy in the signal. In other words, if a signal S is represented by complex samples $\{s_1, s_2, \ldots, s_n\}$, then $$d(S) = \sum_{n=1}^{n} |s_n|^2$$

Here when the signal energy crosses a threshold, a detection is declared. Many other detection schemes are possible as well.

As the level increases, the gain of each beam filter increases and the beamwidth decreases. Thus, signals are put through more spatial filters, narrowing down the possible signal directions, while simultaneously increasing the received signal power. This has the twin effects of (1) finding more signals in (2) narrower angular regions.

In accordance with one embodiment, the tree beam search technique involves adaptive learning of detection thresholds. If everything about the signal environment were known statistically, the thresholds $T_l$ could be set ahead of time. However, in a real system, this is not practical. Hence the thresholds are adaptively adjusted depending on how many signals are being detected at each level. There is wide latitude in the type of adaptive thresholding chosen. A simple approach is described in the immediately following paragraph, but many other options are possible.

If $G_l$ is the gain for each beam at level l and $G_1 < G_2 < \ldots < G_L$, the detection test would be $$d(G_l S) < \text{ or } > T_l?$$

if the signal S was in a particular beam. Thus, $T_1 < T_2 < \ldots < T_L$. It is desirable to maintain a statistically constant probability of detection across each level in order to maintain an efficient search. Thus, the optimal probability of detection $$Pr(d(G_l S) > T_l) = C_l.$$

For example, with a binary tree, by maintaining $C_l = 2$, one may obtain a statistically constant number of signal detections at every level of the search tree. The adaptation could operate simply as follows. Let $c_1 = Pr(d(G_l S) > T_l)$ and $c_2 = Pr(d(G_l S) > T_l^{hi})$ be computed by observing detection at both the current level and above the current level threshold $T_l$. Then set the new threshold value $T_l'$ as follows.

$$T_l' = \frac{T_l^{hi} - T_l}{(c_2 - c_1)(C_l - c_1)} + T_l$$

A tree beam search of the type described above was simulated. The simulation scenario included the following rules and conditions: (1) the number of levels was four, the four levels having 32, 64, 128 and 256 beams respectively; (2) the number of signals present was varied from 16 to 64; (3) beams were randomly assigned to different broadside angles with different amplitudes; and (4) marked signals were not added at the end of each search frame (as was described with reference to FIG. 2). One result of the simulation was that for a direct search, the average latency in this situation was 128D, where D is the basic detection time. Thus, a simulation of the tree beam search technology proposed herein shows a clear advantage in latency.

Figure 8:
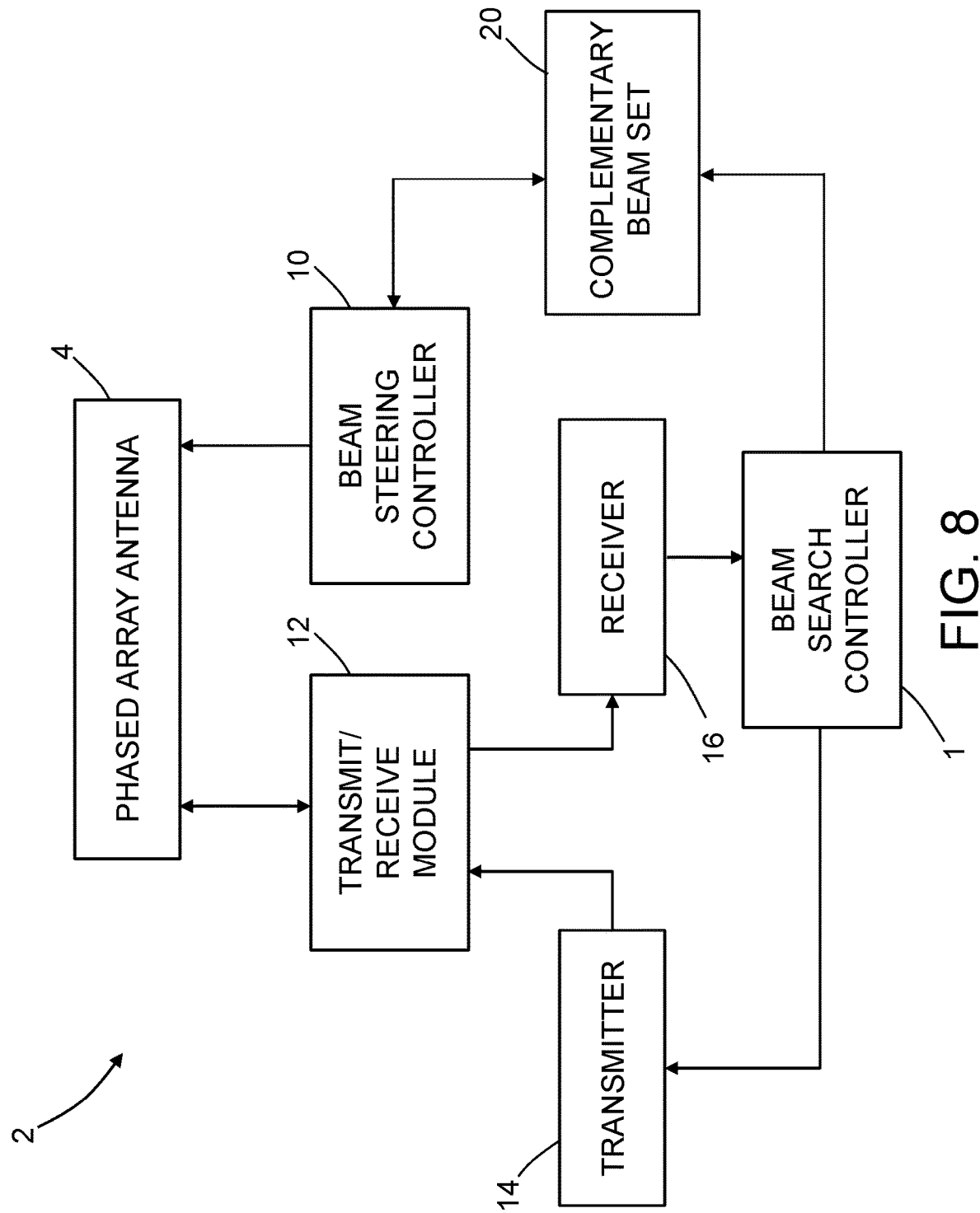
FIG. 8 is a block diagram identifying some components of a phased array antenna system in accordance with one embodiment.

FIG. 8 is a block diagram identifying some components of a phased array antenna system 2 in accordance with one embodiment. The phased array antenna system 2 includes a phased array antenna 4, a transmitter 14, a receiver 16, and a transmit module 12 that connects the transmitter 14 to the phased array antenna 4 in a transmit mode and that connects the receiver 16 to the phased array antenna 4 in a receive mode. The phased array antenna system 2 further includes a beam steering controller 10 configured (e.g., programmed) to control phased array antenna 4 to transmit beams having beamwidths and angles from boresight which are determined by a tree-based beam search. The transmitter 14 and beam steering controller 10 are under the control of a beam search controller 1. The beam search controller 1 is a computer or processor configured (e.g., programmed) to send commands to the transmitter 14 and the beam steering controller 10, which commands cause beams selected by a tree-based beam search to be transmitted by the phased array antenna 4. The beam search controller 1 also includes a module configured for detecting a particular parameter (e.g., energy or power) of signals output by the receiver 16.

The L levels of complementary beams are loaded (e.g., in the form of a data table) into a non-transitory tangible computer-readable storage medium 11 which is accessible by both the beam search controller 1 and the beam steering controller 10. The beam search controller 1 is configured to mark selected beams specified in the complementary beam set data storage medium 11, while the beam steering controller 10 is configured to control the beams created by a phased array antenna 4 in dependence on beam information read from the complementary beam set data storage medium 11.

The embodiments disclosed above use one or more processing or computing devices. Such devices typically include a processor, processing device, or controller, such as a general-purpose central processing unit, a microcontroller, a reduced instruction set computer processor, an ASIC, a programmable logic circuit, an FPGA, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms "processor" and "computing device".

While systems and methods for rapidly finding detectable signals within the field-of-view of a phased array antenna have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for searching for signals using a phased array antenna, the method comprising:
designing a complementary beam tree having first through L-th levels, wherein an index l indicates an l-th level of a total number of levels L, and the l-th level has $2^{l-1}M$ beams;
loading the L levels of the complementary beam tree into a beam steering controller that controls the beams created by the phased array antenna;
marking pre-selected beams in the complementary beam tree for the first through (L−1)-th levels;
for each search frame, performing steps (a) through (g) comprising:
(a) setting phases and amplitudes of antenna elements of the phased array antenna to transmit the pre-selected marked beams in succession;
(b) transmitting the pre-selected marked beams in succession;
(c) following each transmission of a beam, detecting whether a value of a parameter of a received signal indicates that a signal was received which corresponds to the transmitted beam or not;
(d) following each detection that a signal was received which corresponds to the transmitted beam, marking two narrower beams at a next level having respective bandwidths which are narrower than and overlap with respective portions of a bandwidth of the transmitted beam;
(e) setting phases and amplitudes of antenna elements of the phased array antenna to transmit the two marked narrower beams;
(f) transmitting the two marked narrower beams in succession;
(g) following each transmission of a marked narrower beam, iteratively repeating steps (c) through (f) before transmitting a next pre-selected marked beam in step (b);
marking a first subset of additional narrowest beams from the L-th level in order to fill in search gaps after steps (a) through (e) have been iteratively performed for a first search frame of the successive search frames;
setting phases and amplitudes of antenna elements of the phased array antenna to transmit the first subset of marked additional narrowest beams for the first search frame;
marking a second subset of additional narrowest beams from the L-th level in order to fill in search gaps after steps (a) through (e) have been iteratively performed for a second search frame of the successive search frames; and
setting phases and amplitudes of antenna elements of the phased array antenna to transmit the second subset of additional marked beams for the second search frame; and
wherein the first and second subsets of additional narrowest beams at the L-th level are mutually exclusive.

2. A phased array antenna system comprising:
a phased array antenna;
a transmitter;
a receiver;
a transmit module that connects the transmitter to the phased array antenna in a transmit mode and connects the receiver to the phased array antenna in a receive mode;
a beam steering controller configured to control the phased array antenna to transmit beams having beamwidths and angles from boresight which are determined by a tree-based beam search;
a beam search controller configured to send commands to the transmitter and beam steering controller, which commands cause beams selected by a tree-based beam search to be transmitted by the phased array antenna; and
a complementary beam set data storage medium storing data representing specifications of beams of a complementary beam tree organized in L levels, wherein an index l indicates an l-th level of a total number of levels L and the l-th level has $2^{l-1}M$ beams;
wherein the complementary beam set data storage medium is accessible by both the beam search controller and the beam steering controller, the beam search controller is further configured to mark selected beams specified in the complementary beam set data storage medium, and the beam steering controller is further configured to control the beams created by a phased array antenna in dependence on beam information read from the complementary beam set data storage medium for each search frame of a succession of search frames, and
wherein the system is configured to perform the following beam tree search for signals:
(a) the beam search controller sets phases and amplitudes of antenna elements of the phased array antenna to transmit pre-selected marked beams in succession;
(b) the transmitter transmits the pre-selected marked beams in succession;
(c) following each transmission of a beam, the beam search controller detects whether a value of a parameter of a received signal indicates that a signal was received which corresponds to the transmitted beam or not;
(d) following each detection that a signal was received which corresponds to the transmitted beam, the beam search controller marks two narrower beams at a next level having respective bandwidths which are narrower than and overlap with respective portions of a bandwidth of the transmitted beam;
(e) the beam steering controller sets phases and amplitudes of antenna elements of the phased array antenna to transmit the two marked narrower beams;
(f) the transmitter transmits the two marked narrower beams in succession;
following each transmission of a marked narrower beam, the system iteratively repeats steps (c) through (f) before transmitting a next pre-selected marked beam in step (b);
the beam search controller marks a first subset of additional narrowest beams from the L-th level in order to fill in search gaps after steps (a) through (e) have been iteratively performed for a first search frame of the successive search frames;
the beam steering controller sets phases and amplitudes of antenna elements of the phased array antenna to transmit the first subset of marked additional narrowest beams for the first search frame;
the beam search controller marks a second subset of additional narrowest beams from the L-th level in order to fill in search gaps after steps (a) through (e) have been iteratively performed for a second search frame of the successive search frames; and the beam steering controller sets phases and amplitudes of antenna elements of the phased array antenna to transmit the second subset of additional marked beams for the second search frame; and wherein the first and second subsets of additional narrowest beams at the L-th level are mutually exclusive.

3. The phased array antenna system as recited in claim 2, wherein the beam search controller comprises a module configured for detecting a particular parameter of signals output by the receiver.

4. The phased array antenna system as recited in claim 2, wherein the first level includes beams having a first beamwidth, the second level includes beams having a second beamwidth which is less than the first beamwidth, the third level includes beams having a third beamwidth which is less than the second beamwidth, and the L-th level includes beams having an L-th beamwidth which is less than the third beamwidth and less than a beamwidth of any level between the third level and the L-th level.

5. A phased array antenna system comprising:
a phased array antenna;
a transmitter;
a receiver;
a transmit module that connects the transmitter to the phased array antenna in a transmit mode and connects the receiver to the phased array antenna in a receive mode;
a beam steering controller configured to control the phased array antenna to transmit beams having beamwidths and angles from boresight which are determined by a tree-based beam search;
a beam search controller configured to send commands to the transmitter and beam steering controller, which commands cause beams selected by a tree-based beam search to be transmitted by the phased array antenna; and
a complementary beam set data storage medium storing data representing specifications of beams of a complementary beam set organized in L levels, wherein an index l indicates an l-th level of a total number of levels L and an index b indicates a b-th beam in a level;
wherein the complementary beam set data storage medium is accessible by both the beam search controller and the beam steering controller, the beam search controller is further configured to mark selected beams specified in the complementary beam set data storage medium, and the beam steering controller is further configured to control the beams created by a phased array antenna in dependence on beam information read from the complementary beam set data storage medium by performing operations comprising:
detecting that a value of a parameter of a received signal indicates that a signal was received which corresponds to a transmitted beam b of the first level;
following detection that a signal was received for beam b of the first level, performing operations (a) through (f) in sequence (L−1) times, wherein operations (a) through (f) comprise:
(a) determining that the current level l is not the L-th level of the complementary beam set;
(b) following a determination that the current level l is less than the total number of levels L, marking two marked beams in the next level having respective bandwidths which overlap respective portions of a bandwidth of the beam of the complementary beam set corresponding to the signal received;
(c) storing markings for the two marked beams in a first-in first-out buffer;
(d) setting the phases and amplitudes of antenna elements of the phased array antenna to transmit the two marked beams;
(e) transmitting the two marked beams in succession;
(f) detecting that a value of a parameter of a received signal indicates that a signal was received which corresponds to one of the marked beams;
following performance of step (f) for an (L−1)-th level, determining that the current level is the L-th level of the complementary beam set; and
following determining that the current level is the L-th level, declaring that a signal has been detected with a direction of arrival which corresponds to the pointing angle for the one of the marked beams,
wherein the beam search controller is further configured to mark a first subset of additional beams from the L-th level in order to fill in search gaps for a first search frame of the successive search frames;
the beam steering controller is further configured to set phases and amplitudes of antenna elements of the phased array antenna to transmit the first subset of marked additional beams for the first search frame;
the beam search controller is further configured to mark a second subset of additional beams from the L-th level in order to fill in search gaps after steps (a) through (e) have been iteratively performed for a second search frame of the successive search frames; and
the beam steering controller is further configured to set phases and amplitudes of antenna elements of the phased array antenna to transmit the second subset of additional marked beams for the second search frame,
wherein the first and second subsets of additional beams at the L-th level are mutually exclusive.

6. The phased array antenna system as recited in claim 5, wherein the beam search controller comprises a module configured for detecting a particular parameter of signals output by the receiver.

7. The phased array antenna system as recited in claim 5, wherein the complementary beam tree has L levels comprising a first level having M beams, a second level having 2M beams, a third level having 4M beams and an L-th level having $2^{L-1}M$ beams, wherein M and L are integers.

8. The phased array antenna system as recited in claim 7, wherein the first level includes beams having a first beamwidth, the second level includes beams having a second beamwidth which is less than the first beamwidth, the third level includes beams having a third beamwidth which is less than the second beamwidth, and the L-th level includes beams having an L-th beamwidth which is less than the third beamwidth and less than a beamwidth of any level between the third level and the L-th level.

9. The phased array antenna system as recited in claim 5, wherein detecting that the value of the parameter of the received signal indicates that the signal received corresponds to the transmitted beam b of the first level comprises comparing the value of the parameter of the received signal to a detection threshold which is adjustable.

10. The method as recited in claim 1, further comprising:
marking a third subset of additional narrowest beams from the L-th level in order to fill in search gaps after steps (a) through (e) have been iteratively performed for a third search frame of the successive search frames; and setting the phases and amplitudes of antenna elements of the phased array antenna to transmit the third subset of additional marked beams for the third search frame; and wherein the first, second, and third subsets of additional narrowest beams at the L-th level are mutually exclusive.

11. The method as recited in claim 1, further comprising:

following performance of step (c) for an (L−1)-th level, determining that the current level is the L-th level of the complementary beam set; and following determining that the current level is the L-th level, declaring that a signal has been detected with a direction of arrival which corresponds to the pointing angle for the transmitted beam that produced the detected signal.

12. The method as recited in claim 1, wherein step (c) comprises comparing the value of the parameter of the received signal to a detection threshold which is adjustable.

13. The method as recited in claim 12, wherein the parameter is a sum of an energy of the received signal.

14. The method as recited in claim 12, wherein a value of the detection threshold is chosen so that a probability of a signal detection is statistically constant at each level of the binary tree.

15. The method as recited in claim 12, wherein gains at each level increase and the detection thresholds decrease from the first level to the L-th level.

16. The system as recited in claim 2, wherein the beam search controller is configured to perform further operations comprising:

following performance of step (f) for an (L−1)-th level, determining that the current level is the L-th level of the complementary beam set; and following determining that the current level is the L-th level, declaring that a signal has been detected with a direction of arrival which corresponds to the pointing angle for the one of the marked beams.

17. The system as recited in claim 2, wherein step (c) comprises comparing the value of the parameter of the received signal to a detection threshold which is adjustable.

18. The system as recited in claim 17, wherein the parameter is a sum of an energy of the received signal.

19. The system as recited in claim 17, wherein a value of the detection threshold is chosen so that a probability of a signal detection is statistically constant at each level of the binary tree.

20. The system as recited in claim 17, wherein gains at each level increase and the detection thresholds decrease from the first level to the L-th level.

* * * * *